(12) United States Patent
Lepaksha et al.

(10) Patent No.: US 12,299,301 B2
(45) Date of Patent: May 13, 2025

(54) METHODS AND SYSTEMS FOR ALTERING THE PATH OF DATA MOVEMENT FOR LARGE-SIZED MEMORY TRANSACTIONS

(71) Applicant: QUALCOMM INCORPORATED, San Diego, CA (US)

(72) Inventors: Hithesh Hassan Lepaksha, Hyderabad (IN); Darshan Kumar Nandanwar, Bangalore (IN); Sharath Kumar Nagilla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 18/307,686

(22) Filed: Apr. 26, 2023

(65) Prior Publication Data

US 2024/0361931 A1 Oct. 31, 2024

(51) Int. Cl.
*G06F 3/00* (2006.01)
*G06F 3/06* (2006.01)
*G06F 12/0804* (2016.01)
*G06F 12/0811* (2016.01)
(Continued)

(52) U.S. Cl.
CPC .......... *G06F 3/0635* (2013.01); *G06F 3/0604* (2013.01); *G06F 3/0685* (2013.01); *G06F 12/0804* (2013.01); *G06F 12/0811* (2013.01); *G06F 12/0888* (2013.01); *G06F 12/0897* (2013.01); *G06F 2212/1016* (2013.01); *G06F 2212/1024* (2013.01); *G06F 2212/502* (2013.01)

(58) Field of Classification Search
None
See application file for complete search history.

(56) References Cited

U.S. PATENT DOCUMENTS

| | | | |
|---|---|---|---|
| 2009/0228662 A1* | 9/2009 | Chang | G06F 12/0246 711/E12.066 |
| 2016/0154753 A1* | 6/2016 | Gittins | G06F 12/0811 710/117 |
| 2019/0102292 A1 | 4/2019 | Agarwal et al. | |

(Continued)

OTHER PUBLICATIONS

Related PCT Patent App. Ser. No. PCT/US2024/019439, filed on Mar. 11, 2024, International Search Report (ISR) and Written Opinion issued by the EPO (ISA), issued on Jun. 24, 2024, 8pages.

*Primary Examiner* — Midys Rojas
(74) *Attorney, Agent, or Firm* — Smith Tempel Blaha LLC/Qualcomm

(57) ABSTRACT

Systems and methods for reducing data movement when performing large-sized memory transactions in a memory hierarchy are provided. For certain preselected types of large-size memory transactions, such as memset and memcopy operations, for example, logic of the processor determines whether the type of memory transaction being queued is one of the preselected types for which alteration of the path of data movement is an option. Logic of the processor also determines whether the size of the memory block associated with the transaction is sufficiently large to warrant altering the path of data movement. If the type is one of the preselected types and the size of the memory block is sufficiently large, logic of the LLC controller selects an altered path for data movement that reduces data movement and performs the transaction using the altered path.

20 Claims, 7 Drawing Sheets

(51) Int. Cl.
  *G06F 12/0888* (2016.01)
  *G06F 12/0897* (2016.01)

(56) References Cited

U.S. PATENT DOCUMENTS

2019/0102311 A1  4/2019  Gupta et al.
2024/0064560 A1* 2/2024  Konda .............. H04W 28/0247

* cited by examiner

METHODS AND SYSTEMS FOR ALTERING THE PATH OF DATA MOVEMENT FOR LARGE-SIZED MEMORY TRANSACTIONS

DESCRIPTION OF THE RELATED ART

A computing device may include multiple processor-based subsystems. Such a computing device may be, for example, a portable computing device ("PCD"), such as a laptop or palmtop computer, a cellular telephone or smartphone, portable digital assistant, portable game console, server processors, etc. Still other types of PCDs may be included in, for example, autonomous automotive systems and Internet-of-Things ("IoT") applications.

The multiple processor-based subsystems may be included within the same integrated circuit chip or in different chips. A "system-on-a-chip", or "SoC", is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other subsystems, such as a transceiver or "modem" subsystem that provides wireless connectivity, a memory subsystem, etc.

Processors of SoCs such as CPUs and GPUs, for example, utilize on-chip memory that resides in the processor chip, such as core registers and level 1 (L1)-level 3 (L3) cache memory, as well as other types of memory that is external to the processor, such as last level cache (LLC) and dynamic random access memory (DRAM). The DRAM and the LLC are typically shared resources of the SoC that are utilized by multiple processors of the SoC. All of these different types of memory devices make up the memory hierarchy that is used by processors of the SoC.

Memory setting (memset) and memory copying (memcopy) operations performed by application program interfaces (APIs) of the SoC actively involve all of the levels of the memory hierarchy. A memset operation is an operation that sets a block of addresses of memory to a particular value. A memcopy operation is an operation that copies a block of data from one set of addresses in memory to another set of addresses in memory. Large-sized memset and memcopy operations produce undesired effects, including pollution of the L1-L3 caches of the processor, which adversely impacts its performance, consumption of power due to data movement during cache memory transactions, and accelerated aging of the processor's silicon due to redundant transactions in the processor core domain. A need exists for a solution that reduces these undesired effects that result from these large-sized memory transactions.

SUMMARY OF THE DISCLOSURE

Systems, methods, and other examples are disclosed for performing memory transactions in a way that reduces data movement in a memory hierarchy.

An exemplary method for performing memory transactions in a way that reduces data movement in a memory hierarchy comprise determining whether or not a type of memory transaction being queued in one or more cores of the processor for execution by the processor is one of a plurality of preselected types for which data path alteration is an option. The method may further comprise determining whether or not the size of a memory block in a system memory associated with the memory transaction exceeds a first preselected size threshold, $S\_TH_1$, value. The method may further comprise selecting an altered path of data movement for performing the memory transaction if determinations are made that the memory transaction type is one of the preselected types and that the memory block size exceeds the $S\_TH_1$ value. The selected altered path reduces an amount of data movement relative to unaltered paths of data movement that are used for performing memory transactions that are not of the preselected types. The method may further comprise causing the memory transaction to be performed using the altered path of data movement.

An exemplary embodiment of the system for reducing data movement when performing memory transactions in a memory hierarchy comprises a processor comprising logic configured to determine whether or not a type of memory transaction being queued in one or more cores of the processor for execution by the processor is one of a plurality of preselected types of memory transactions and to determine whether or not a size of a memory block in a system memory associated with the memory transaction exceeds a first preselected size threshold, $S\_TH_1$, value. The processor may further comprise logic configured to output the memory transaction type, the memory block size and one or more system memory addresses associated with the memory transaction if determinations are made that the memory transaction type is one of the preselected types and that the memory block size exceeds the $S\_TH_1$ value.

The system can further comprise an LLC controller of the memory hierarchy that is electrically coupled to the processor via an interconnect device of the memory hierarchy. The LLC controller receives the memory transaction type, the memory block size and the one or more system memory addresses associated with the memory transaction outputted by the processor via the interconnect device. The LLC controller comprises LLC memory and a last level coprocessor (LCP). The LCP comprises logic configured to select an altered path of data movement for performing the transaction that reduces an amount of data movement relative to unaltered paths of data movement that are used for performing memory transactions that are not of the preselected types. The logic of the LCP is further configured to cause the memory transaction to be performed using the altered path of data movement.

An exemplary embodiment of a non-transitory computer-readable medium comprises computer instructions for execution by a processor and by an LLC controller of a memory hierarchy to reduce data movement when performing memory transactions. The computer instructions comprise a first set of computer instructions for determining whether or not a type of memory transaction being queued in one or more cores of the processor for execution by the processor is one of a plurality of preselected types for which data path alteration is an option. The computer instructions may further comprise a second set of computer instructions for determining whether or not a size of a memory block in a system memory associated with the memory transaction exceeds a first preselected size threshold, $S\_TH_1$, value. The system memory is a part of the memory hierarchy.

The computer instructions may further comprise a third set of computer instructions for forwarding the memory transaction type, the size of the memory block and one or more system memory addresses associated with the memory transaction to the LLC controller of the memory hierarchy if the processor, in executing the first and second sets of computer instructions, determines that the memory transaction type is one of the preselected types and that the memory block size exceeds the $S\_TH_1$ value.

The computer instructions may further comprise a fourth set of computer instructions for receiving the transaction type, the size of the memory block and the one or more system memory addresses in the LLC controller via an interconnect device of the memory hierarchy and for selecting an altered path of data movement for performing the transaction relative to unaltered paths of data movement that are used for performing memory transactions that are not of the preselected types. The computer instructions may further comprise a fifth set of computer instructions for execution by the LLC controller for causing the memory transaction to be performed using the altered path of data movement.

These and other feature and advantages will become apparent from the following description, drawings and claims.

BRIEF DESCRIPTION OF THE DRAWINGS

In the Figures, like reference numerals refer to like parts throughout the various views unless otherwise indicated. For reference numerals with letter character designations such as "101a" or "101b", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The present disclosure discloses systems and methods for reducing data movement in a memory hierarchy when performing large-sized memory transactions. For certain preselected types of large-size memory transactions, such as memset and memcopy operations, for example, logic of the processor determines whether the type of memory transaction being queued is one of the preselected types of large-sized transactions for which alteration of the path of data movement is an option. Logic of the processor also determines whether the size of the memory block associated with the transaction is sufficiently large to warrant altering the path of data movement. If the type is one of the preselected types and the size of the memory block is sufficiently large, logic of the LLC controller selects an altered path for data movement that reduces data movement. The LLC performs the transaction using the altered path.

Figure 1:
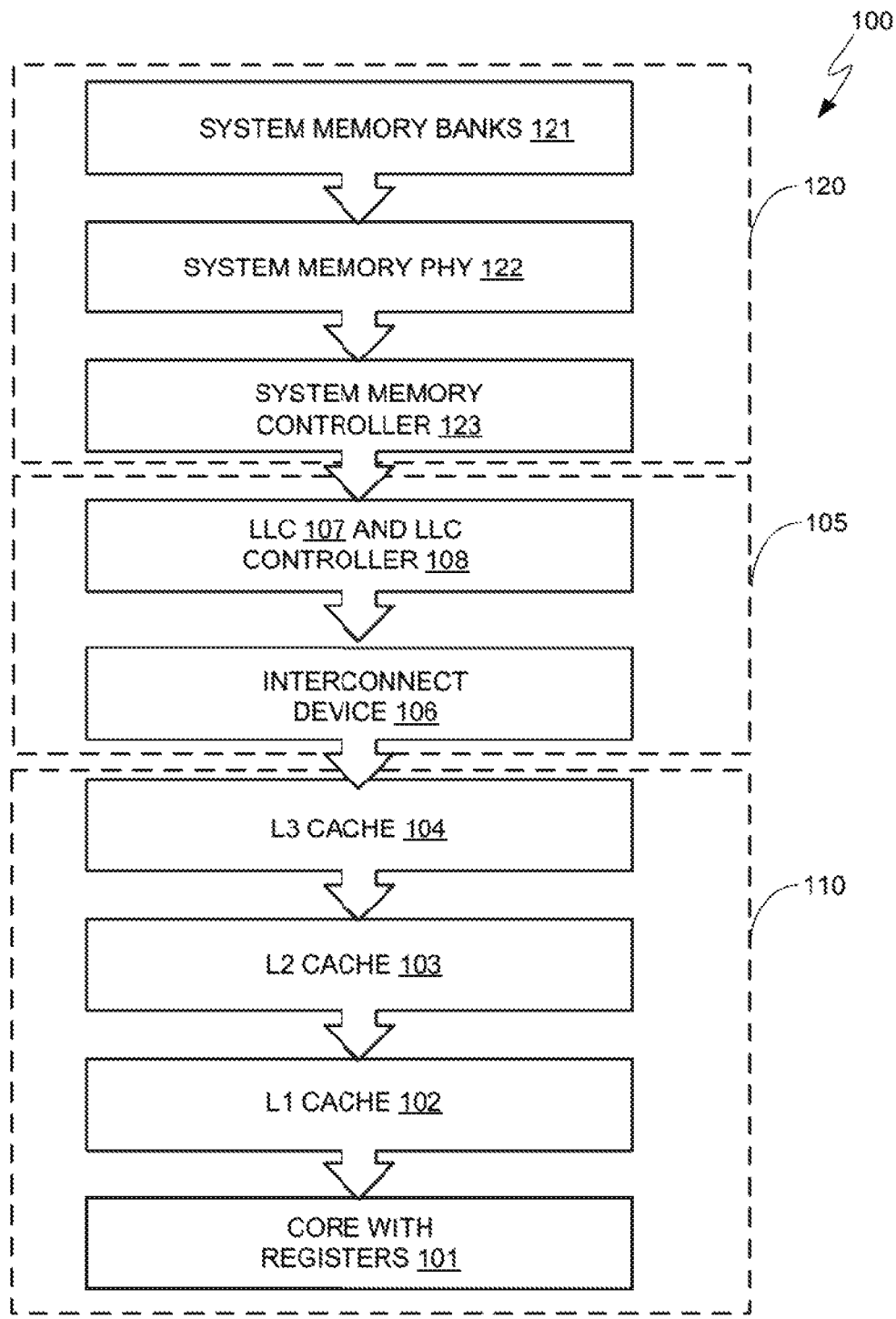
FIG. 1 is a block diagram of an example of a memory hierarchy currently used by a CPU of an SoC, which includes a core with registers and L1-L3 cache memory devices of the CPU, an external system memory, and an interconnect structure that interconnects the CPU with system memory.

FIG. 1 is a block diagram of an example of a memory hierarchy 100 currently used by a CPU 110 of an SoC, which includes a core with registers 101 and L1-L3 cache memory devices 102-104, respectively, of the CPU 110, an external system memory 120, and an interconnect structure that interconnects the CPU 110 with system memory 120. The interconnect structure 105 comprises an interconnect device 106, an LLC memory device 107 and an LLC controller 108. The external system memory 120 comprises a system memory device 121 (e.g., banks of a double data rate (DDR) DRAM), a system memory physical layer (PHY) 122 and a system memory controller 123. In addition to being used by the CPU 110, the system memory 120 and the LLC memory device 107 and controller 108 are typically also used by other processors of the SoC.

Currently, memcopy operations are executed by the core of the CPU 110 issuing a read operation for the source address of the system memory 120 and then issuing a write operation to the destination address in system memory 120, for every word of memory being copied. Memset operations are executed by the core of the CPU 110 issuing a write operation for every word of memory being set. The read and write operations issued by the core of the CPU 110 involve all of the components of the memory hierarchy 100, i.e., the core with registers 101, the L1-L3 cache memory devices 102-104, respectively, the LLC memory device 107/LLC controller 108, system memory device 121, PHY 122 and system memory controller 123.

Large-sized memset and memcopy operations produce certain undesired effects, including: (1) pollution of L1-L3 cache memory devices 102-104, respectively, which adversely impacts the performance of the CPU 110; (2) power consumption due to data movement during cache memory transactions; and (3) accelerated aging of the silicon of the CPU 110 due to redundant transactions in the core processing logic and registers 101.

The total power consumed by the memory hierarchy 100 in this current implementation can be expressed as:

Total Power Consumed = (Equation 1)

power usage in the core/registers 101 + power usage by $L1$ cache $102 + L2$ cache $103 + L3$ cahce $104 +$ -continued power usage by the interconnect device 106 + power usage of the LLC memory device 107 + power usage by the LLC controller 108 + power usage by system memory 120 ..

As will be described below with reference to representative, or exemplary, embodiments, the present disclosure discloses a modified memory hierarchy and methods that prevent the entire memory hierarchy from being involved in every memset and memcopy operation, thereby reducing these undesired effects.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The word "representative" may be used herein synonymously with "exemplary." Any aspect described herein as "exemplary" is not necessarily to be construed as preferred or advantageous over other aspects. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or more memory devices. The memory may, for example, be multiple memories within the same computer system. The memory may also be multiple memories distributed amongst multiple computer systems or computing devices.

A "processor", as that term is used herein encompasses an electronic component that is able to execute a computer program or executable computer instructions. References herein to a computer comprising "a processor" should be interpreted as one or more processors. The processor may for instance be a multi-core processor comprising multiple processing cores, each may comprise multiple processing stages of a processing pipeline. A processor may also refer to a collection of processors within a single computer system or distributed amongst multiple computer systems.

A computing device may include multiple subsystems, cores or other components. Such a computing device may be, for example, a PCD, such as a laptop or palmtop computer, a cellular telephone or smartphone, a portable digital assistant, a portable game console, an automotive safety system of an autonomous driving vehicle, etc.

Figure 2:
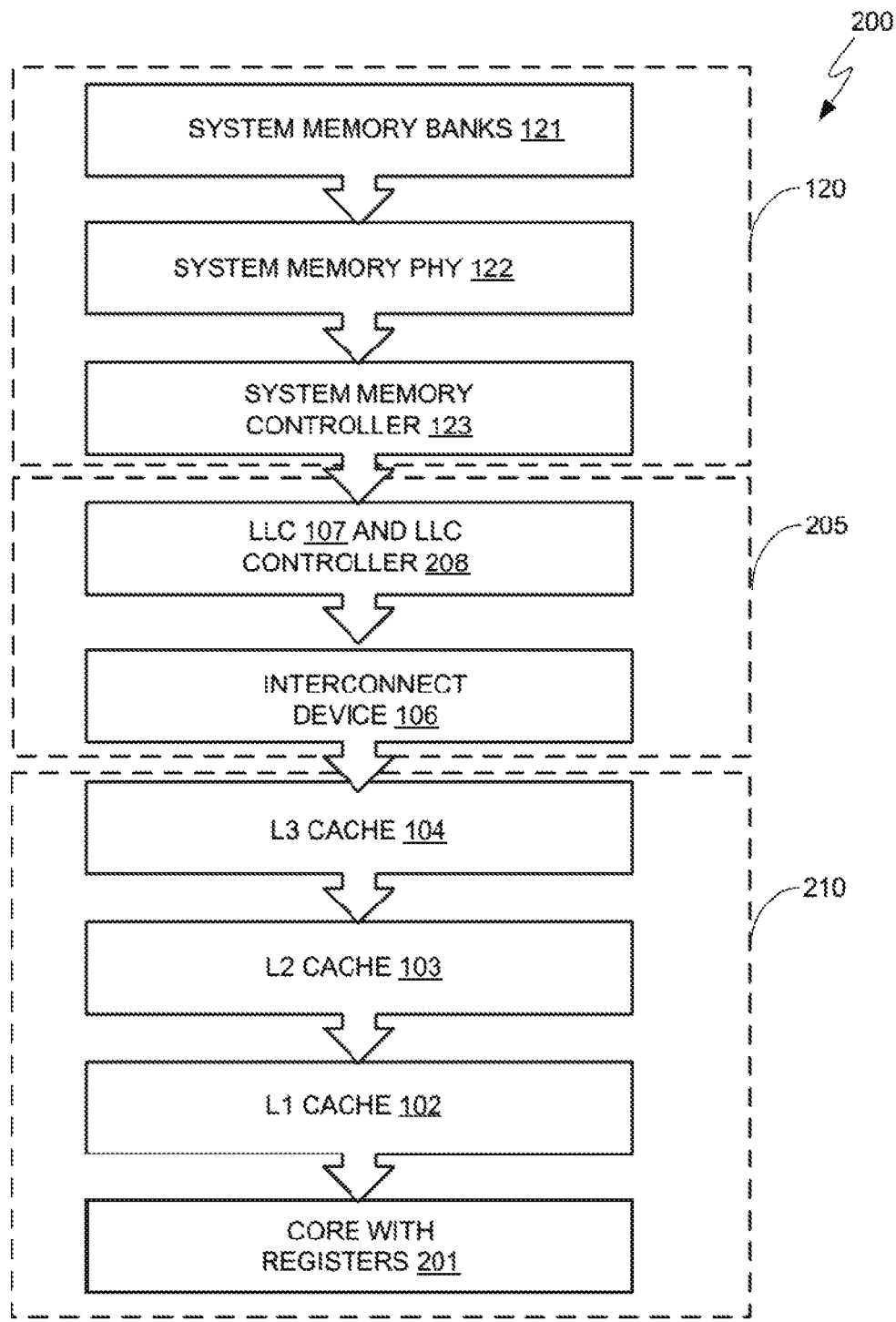
FIG. 2 is a block diagram of an example of a memory hierarchy in accordance with a representative embodiment comprising components of the memory hierarchy shown in FIG. 1 that have been modified to reduce the aforementioned undesired effects produced by large-sized memset and memcopy operations.

FIG. 2 is a block diagram of an example of a memory hierarchy 200 in accordance with a representative embodiment comprising components of the memory hierarchy 100 shown in FIG. 1 that have been modified to reduce the aforementioned undesired effects produced by large-sized memset and memcopy operations. FIG. 2 is identical to FIG. 1 except that modifications have been made to circuits of the core with registers 101 of the CPU 110 shown in FIG. 1 and to circuits of the LLC controller 108 shown in FIG. 1. Specifically, in FIG. 2, the core with registers 201 and the LLC controller 208 comprise logic circuits that work together to cause the path of data movement in the memory hierarchy 200 to be altered for large-sized memset and memcopy operations. Exemplary embodiments of these logic circuits of the core with registers 201 and of the LLC controller 208 are described below with reference to FIGS. 5 and 6, respectively.

With reference to FIG. 2, the memory hierarchy 200 comprises the core with registers 201 and L1-L3 cache memory devices 102-104 of the CPU 210, the interconnect device 106, LLC memory device 107 and LLC controller 208 of interconnect structure 205, and system memory 120. The interconnect structure 205 interconnects the CPU 210 with the LLC 107, with the LLC controller 208 and with system memory device 120. The system memory 120 comprises the system memory device 121 (e.g., banks of a DDR DRAM device), PHY 122 and system memory controller 123 (e.g., a DDR DRAM memory controller).

Figure 3:
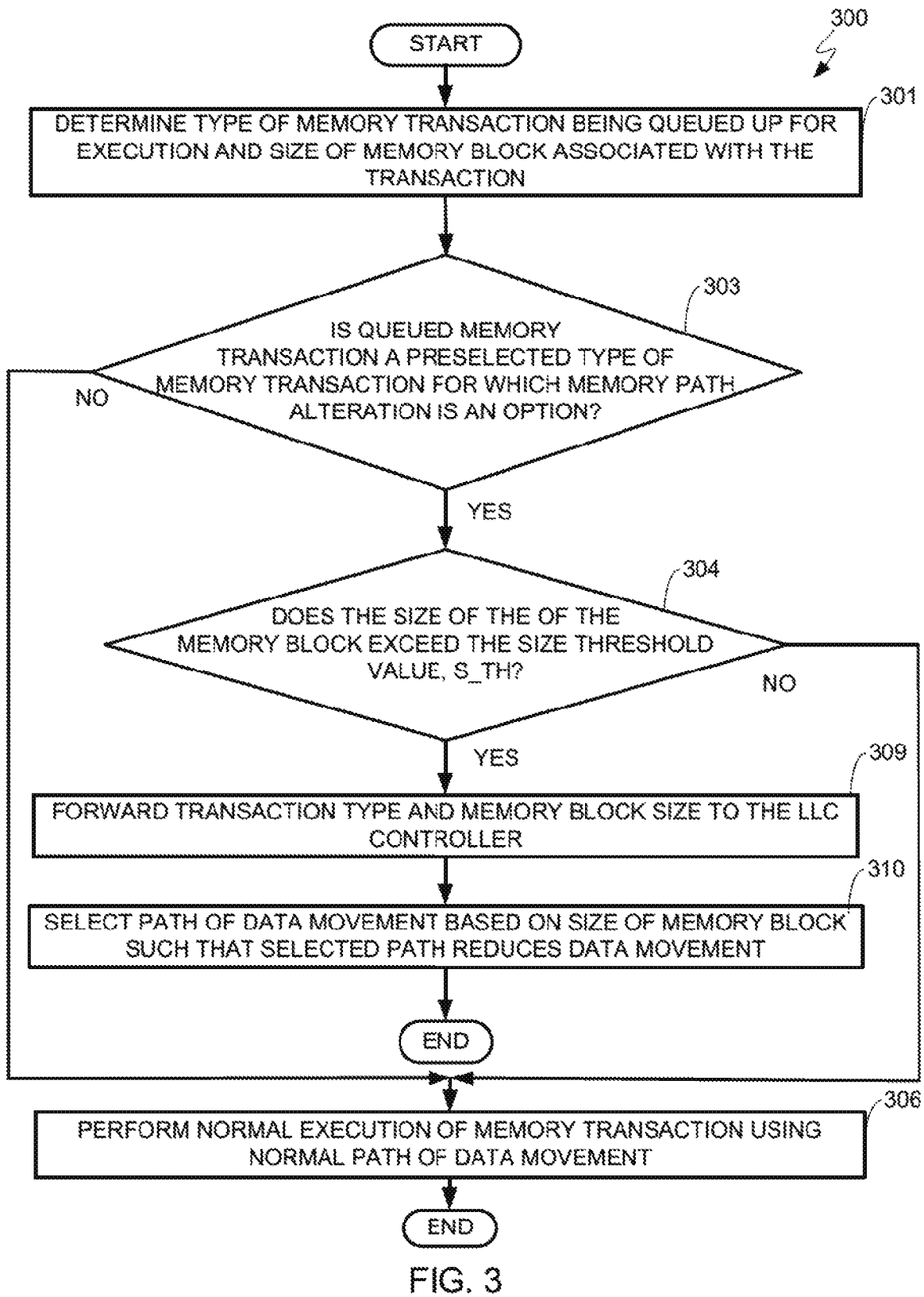
FIG. 3 is a flow diagram representing the method performed by a combination of the aforementioned logic circuits of the core with registers and of the LLC controller shown in FIG. 2 to select a path of data movement that reduces the aforementioned undesired effects when large-sized memset and memcopy transactions are being performed.

FIG. 3 is a flow diagram representing the method 300 performed by a combination of the aforementioned logic circuits of the core with registers 201 and of the LLC controller 208 to select a path of data movement that reduces the aforementioned undesired effects when large-sized memset and memcopy transactions are being performed. At the step represented by block 301, logic circuitry of the CPU core 201 determines the type of memory transaction that is being queued up in the core with registers 201 for execution, as well as the size of the memory block associated with the transaction, as indicated by block 301. The logic circuitry of the core with registers 201 forwards the transaction type and size to the LLC controller 208 via the interconnect device 106 (e.g., in the form of metadata), as indicated by block 302. An exemplary embodiment of the logic circuitry that performs these tasks is described below with reference to FIG. 5.

Circuitry of the LLC controller 208 is configured to receive and process the information identifying the type of memory transaction to be performed to determine whether the type of transaction is one of a plurality of preselected types of large-sized memory transactions for which data movement path alteration is to be performed. The preselected types include memset and memcopy transactions, but can include additional large-sized memory transactions. If a determination is made at block 303 that the memory transaction that is being queued is not one of the preselected types, then the process proceeds to block 306 and the transaction is performed using the normal path of data movement discussed above with reference to FIG. 1.

If a determination is made at block 303 that the memory transaction that is being queued is one of the preselected types, the process proceeds to block 304 at which a determination is made by the logic of the core with registers 201 as to whether the size of the memory block associated with the transaction being queued exceeds a preselected, configurable size threshold value, S_TH. The S_TH value preferably is based on the size of LLC memory device 107 and preferably is equal to the size of the LLC memory device 107. The S_TH value preferably can be updated in firmware of the LLC controller 208.

If a determination is made at block 304 that the size of the memory block associated with the transaction does not exceed the S_TH value, then the process proceeds to block 306 and the LLC controller 208 causes the transaction to be performed using the normal path of data movement discussed above with reference to FIG. 1. If a determination is made at block 304 by the logic of the core with registers 101 that the size of the memory block exceeds the S_TH value, then the core with registers 201 forwards the memory block size and the transaction type to the LLC controller 208, as indicated by block 309. The LLC controller 208 then causes the path of data movement to be selected such that data movement is reduced when performing the memory transaction, as indicated by block 310. It should be noted that the processes represented by blocks 303 and 304 can be reversed in order or performed simultaneously.

In accordance with the preferred embodiment, the selected path of data movement excludes the interconnect device 106 and the CPU 210, as will be described below in more detail with reference to FIGS. 5 and 6. Excluding the interconnect device 106 and the CPU 210 from the path of data movement reduces the aforementioned undesired effects: (1) pollution of L1-L3 caches 102-104, respectively; (2) power consumption due to L1-L3 cache memory transactions; and (3) accelerated aging of the silicon of the CPU 210 due to redundant transactions in the CPU 210. With respect to reducing power consumption, the total power consumed by the memory hierarchy in accordance with this embodiment can be expressed as:

Total Power Consumed = (Equation 2)
    power usage of LLC 107 Power Usage +
    power usage of LLC controller 208 +
    power usage of system memory 120

The power savings achieved in accordance with this embodiment can be seen from a comparison of Equations 1 and 2. In Equation 2, the following terms from Equation 1 have been eliminated: power usage in the core/registers 101+power usage by L1 cache+L2 cache+L3 cache 102-104+power usage by the interconnect device 106. Thus, a significant savings in power is achieved by altering the path of data movement for large-sized memory transactions.

Figure 4:
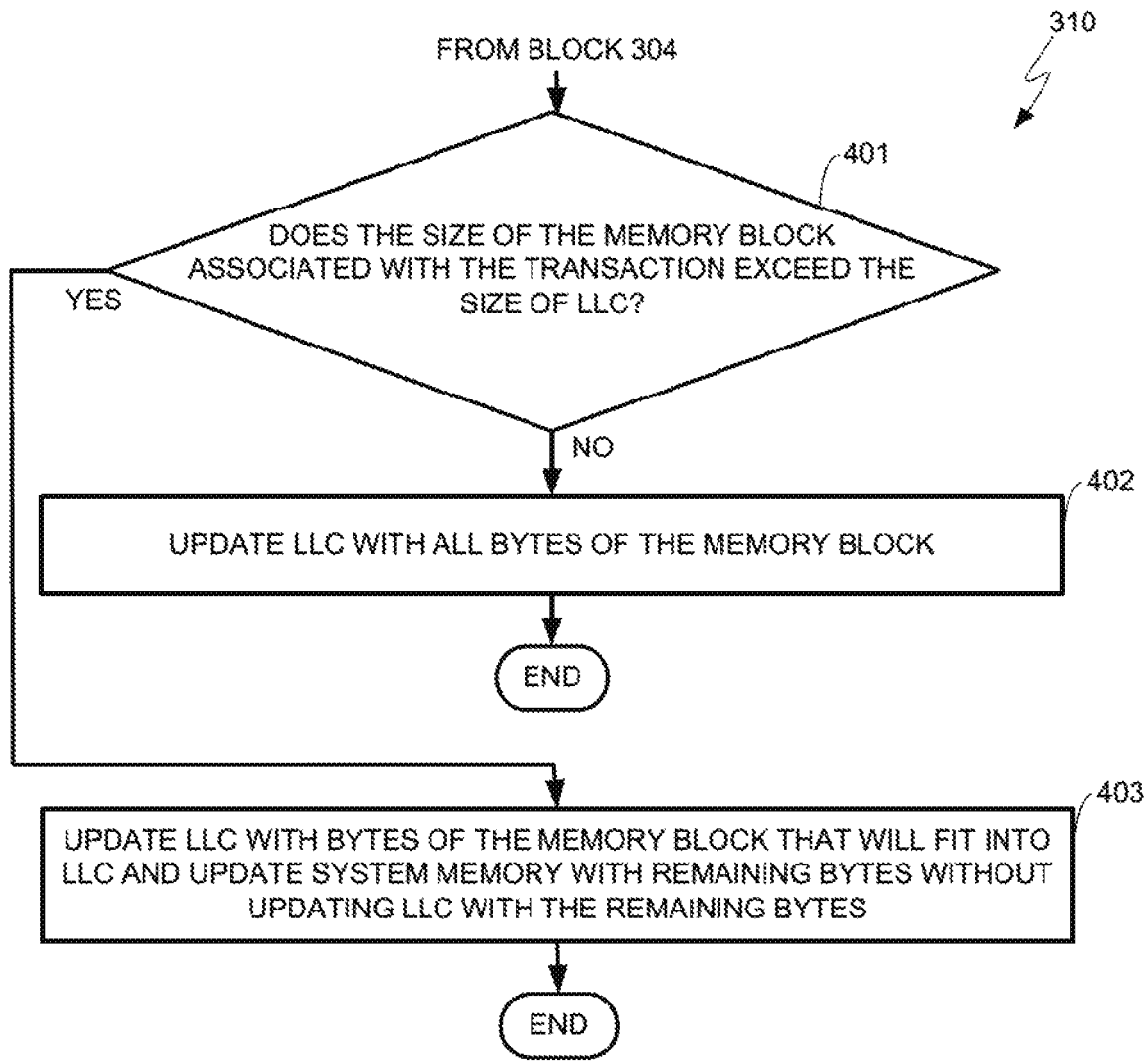
FIG. 4 is a flow diagram of the process represented by block 310 of FIG. 3 in accordance with an exemplary embodiment for selecting the path of data movement for the large-sized memory transaction being queued.

FIG. 4 is a flow diagram of the process represented by block 310 of FIG. 3 in accordance with an exemplary embodiment for selecting the path of data movement for the large-sized memory transaction being queued. In accordance with an exemplary embodiment, the process of selecting the path of data movement represented by block 310 depends on whether or not the size of the memory block, S_M, exceeds the size of LLC 107, S_L. At the step represented by block 401, the LLC controller 208 determines whether or not the size of the memory block, S_M, to be transferred exceeds the size of LLC 107, S_L. If not, the LLC controller 208 writes all of the bytes of the memory block to the LLC 107, as indicated by block 402.

If the LLC controller 208 determines at block 401 that the size of the memory block S_M exceeds the size of LLC 107 S_L, then the LLC controller 208 writes as many bytes of the memory block to the LLC 107 as will fit in the LLC 207 without the LLC 107 being updated with the remaining bytes, as indicated by block 403. System memory 120 causes its memory banks 121 to be updated with the remaining bytes, but this would happen any way using the current implementation described above with reference to FIG. 1. The sequence of bytes of the memory block written to LLC 107 can start with the first S_L kilobyte (KB), the last S_L KB or some other starting point of interest, depending on the manner in which the LLC controller 208 is configured to perform this task.

Figure 5:
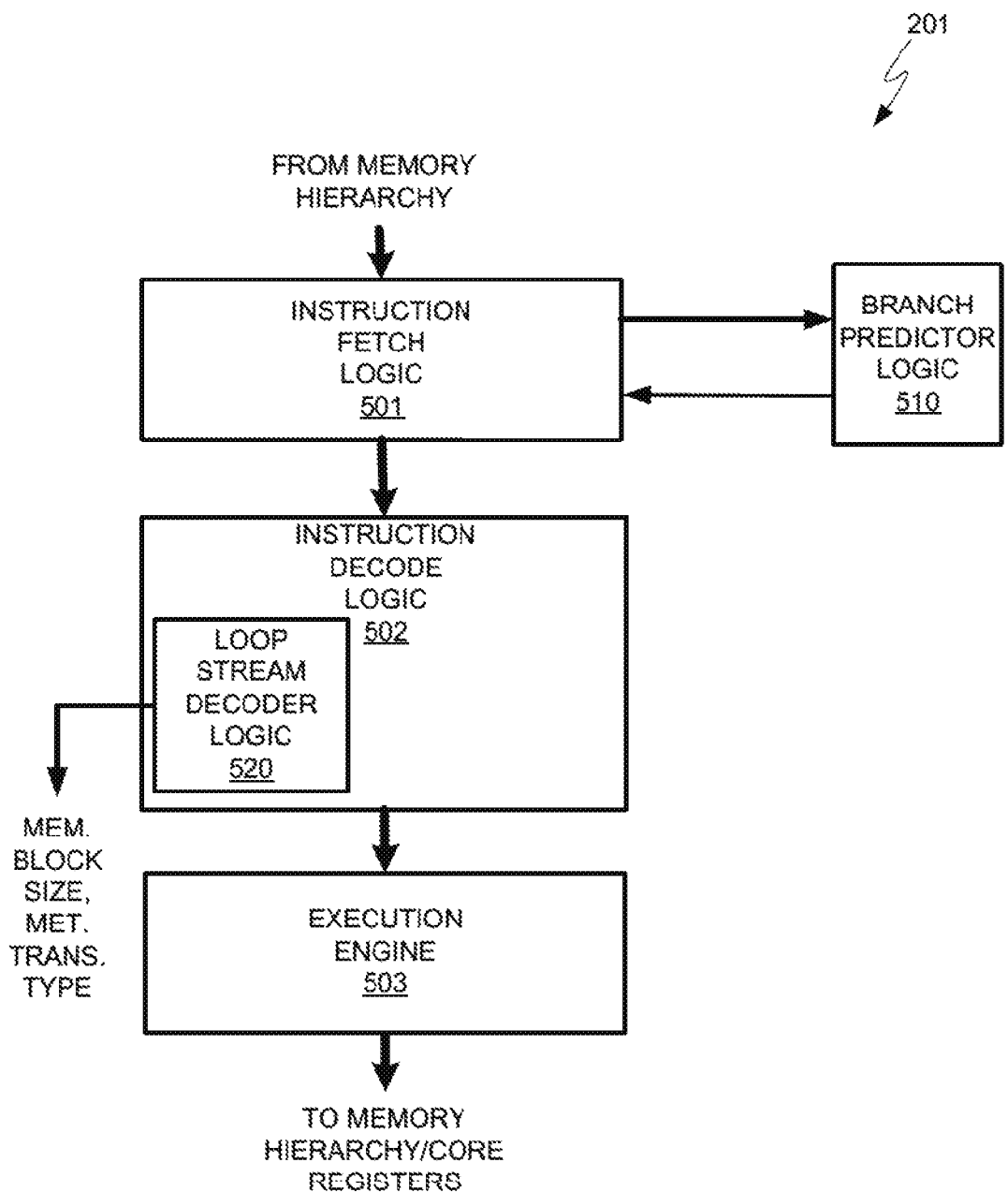
FIG. 5 illustrates a block diagram of the core with registers 201 shown in FIG. 2 comprising branch predictor logic and loop stream decoder logic for detecting the type of instruction being queued and the size of the memory block associated with the memory transaction.

FIG. 5 illustrates a block diagram of the core with registers 201 shown in FIG. 2 comprising branch predictor logic 510 and loop stream decoder logic 520 for detecting the type of instruction being queued and the size of the memory block associated with the memory transaction, respectively. The instruction fetch logic 501, the instruction decode logic 502 and the execution engine 503 are existing components of processing cores of CPUs. The branch predictor logic 510 and the loop stream decoder logic 520 have been modified in accordance with embodiments of the present disclosure to allow the CPU 210 to perform the operations described above with reference to block 303 of the flow diagram of FIG. 3 to determine the type of instruction being queued and the size of the associated memory block.

Processors execute instructions in a sequential control flow, i.e., one instruction after the another. A branching operation allows the program to change the execution flow by jumping to the starting point of a new sequence of instructions that needs to be executed. The branch predictor logic 510 is logic that predicts the starting point of the next sequence of instructions after jumping to the new sequence of instructions. This helps the instruction fetch logic 501 fetch the next sequence of instructions early and forward it to the instruction decode logic 502.

A loop is a sequence of instructions that is continually repeated until a certain condition is reached. Typically, execution of a sequence of instructions leads to retrieving an item of data and processing it to change it. This processing is repeated until a certain condition is true, such as whether or not a counter has reached a prescribed number. In processor execution flow, there is a movement of instructions from memory to the processor core and movement of data bidirectionally between the processor core and memory. A stream refers to the flow of instructions or data between memory and the processor core. For example, copying a file from one folder to another leads to streaming of data content from the starting byte of the file to the ending byte of the file.

The instruction decode logic 502 decodes the fetched instructions and performs the process represented by block 303 of FIG. 3 to determine the type of instruction to be executed. The loop stream decoder logic 520 analyzes the decoded instructions to obtain the loop count and/or stream length from the decoded instruction. Based on the loop count and/or the stream length, the loop stream decoder logic 520 determines the size of the memory block associated with the instruction being decoded and performs the processes of block 304 to determine whether the size exceeds the size threshold value. If so, the CPU 210 forwards the memory block size and the transaction type to the LLC controller 208. Otherwise, the CPU 210 uses the normal data flow path of executing the instruction in the execution engine 203 and sending the result to other registers of the CPU 210 or to system memory 120.

Figure 6:
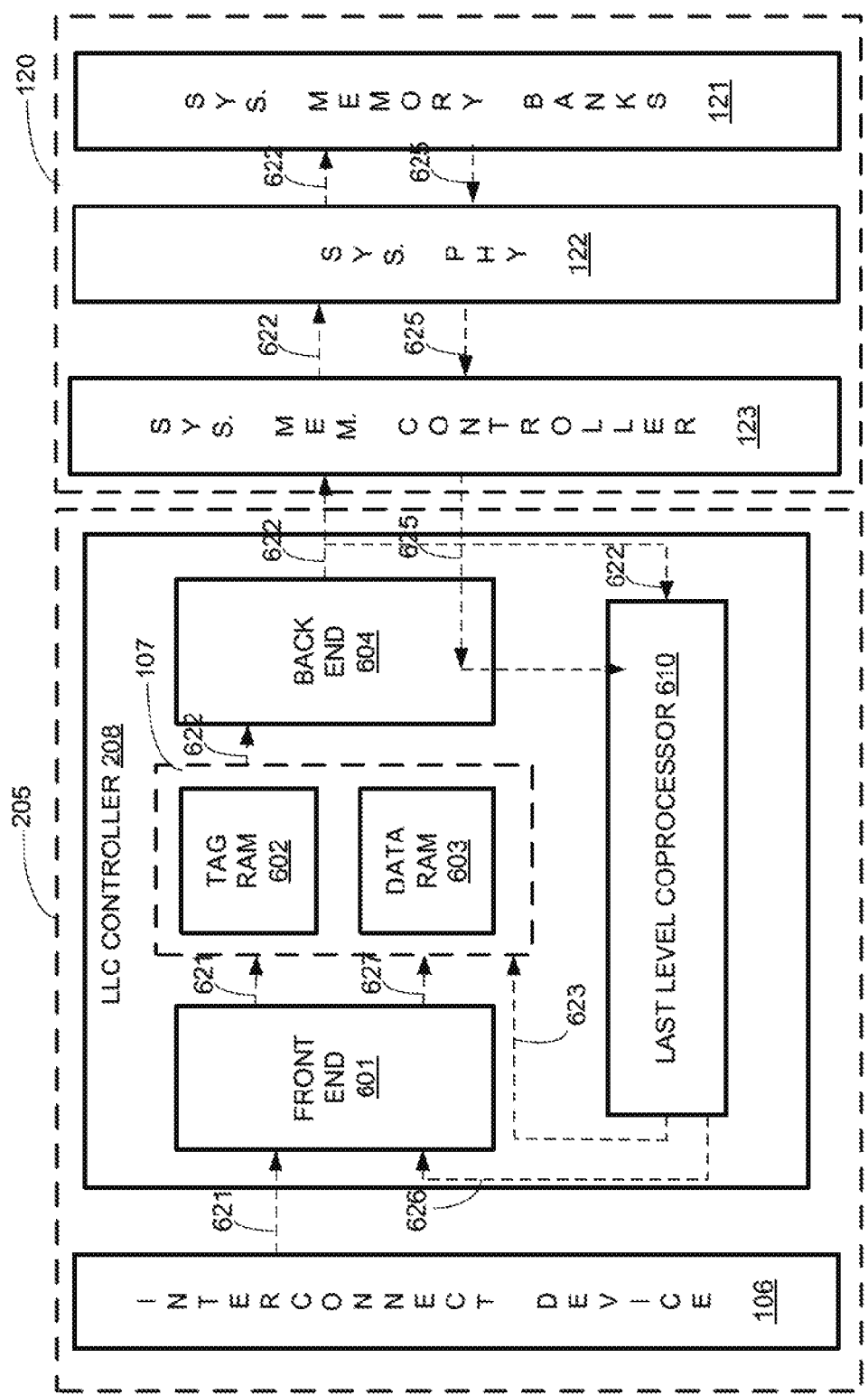
FIG. 6 is a block diagram of the interconnect device, the system memory, the LLC, and the LLC controller shown in FIG. 2, which comprises logic of the LLC controller configured to perform the operations described above with reference to the flow diagram of FIG. 4 to select the data path and write some or all of the associated data to the LLC, depending on the size of the memory block.

FIG. 6 is a block diagram of the interconnect device 106, the system memory 120, the LLC 107, and the LLC controller 208, which comprises logic configured to perform the operations described above with reference to the flow diagram of FIG. 4 to select the data path and write some or all of the associated data to the LLC 107, depending on the size of the memory block. A last level coprocessor (LCP) 610 of the LLC controller 208 is configured with logic to perform the process represented by the flow diagram of FIG. 4. A front end (FE) 601 interfaces with the interface device 106, decodes the address and extracts data from the incoming transaction. The LLC 107 comprises TAG RAM 602 and DATA RAM 603 that hold tags and data, respectively, in the cache structure. The back end (BE) 604 interfaces with the system memory controller 123. When there is a cache miss on the LLC 107, the transaction is forwarded to the system memory controller 123 via the BE 604. The BE 604 also sends the incoming read or write transaction details with meta data to LCP 610.

As indicated above, the LCP 610 is the intelligent entity present in LLC controller 208 that can read the incoming transaction metadata and take necessary actions, such as generating transactions to FE 601 to mimic incoming transactions from the interconnect device 106 according to the size of the memory block present in the metadata of memcopy and memset APIs. The decision making of block 401 of FIG. 4 and the operations represented by blocks 402 and 403 of FIG. 4 are performed by the LCP 610.

For a memset operation for a block of memory addresses having a size that exceeds the S_TH value of block 304 of FIG. 3, the starting address in system memory 120, the memory block size and the data are encoded in the metadata received in the LLC controller 208 from the CPU 210. The LLC controller 208 writes the data to the banks of system memory 121 from the starting address to an ending address equal to the starting address+size of memory block and to the LLC 107. The path of data movement for the write is represented by arrows 621 and 622. Path 621 is from the interconnect device 106 to FE 601 to LLC 107. Path 622 is from LLC 107 to system memory controller 123 via BE 604, to PHY 122 and to memory banks 121.

The LCP 610 reads the metadata received from the interconnect device 106 by the FE 601, generates the next transactions and updates the LLC 107 until the size of memory to be SET is reached, assuming the size of the data to be written does not exceed the size of the LLC 107 as determined at block 401. If the size of the data to be written exceeds the size of the LLC 107, as determined at block 401, then only a portion of the data equal in size to the size of the LLC 107 is written to the LLC 107, as indicated by block 403. The path for this write is represented by arrow 623 from LCP 610 to LLC 107 and by arrows 622 from LLC 107 to system memory controller 123 via BE 604, to PHY 122 and to memory banks 121.

For a memcopy operation for a block of memory addresses that exceeds the S_TH value of block 304 of FIG. 3, the source address in system memory device 120, the destination address in system memory 120 and the size of the block of addresses to be copied are encoded in the metadata received in the LLC controller 208 from the interconnect device 106 via the FE 601. The data is read from the source address and the LLC 107 is updated. The corresponding path of data movement is represented by arrows 621, 622, 625 and 623. The corresponding path of data movement is represented by arrows 621, 622 and 625. The LCP 610 then uses the received data to generate the write transaction for the destination address to copy it into system memory 120. The corresponding path of data movement is represented by arrows 626, 627 (optional) and 622. The next reads and associated writes are generated by the LCP 610 until the copy size is met. If the size of the data is larger than the size of the LLC 107, the LLC 107 is only updated on paths 626 and 627 for the portion of the data that can be held in the LLC 107, as indicated by block 403 of FIG. 4. For the portion of the data that exceeds the size of the LLC 107, data movement is along paths 626 and 622.

It can be seen from the description of FIG. 6 that the portion of the memory hierarchy 200 (FIG. 2) comprising the interconnect device 106 and the CPU 210 is not involved in either of these large-sized memory transactions. This results in zero pollution of the L1-L3 caches and registers of the core of the CPU 210, which improves performance of the CPU 210, lower power consumption and less aging of the silicon of the CPU 210 due to a reduced number of computations being performed by the core of the CPU 210.

Figure 7:
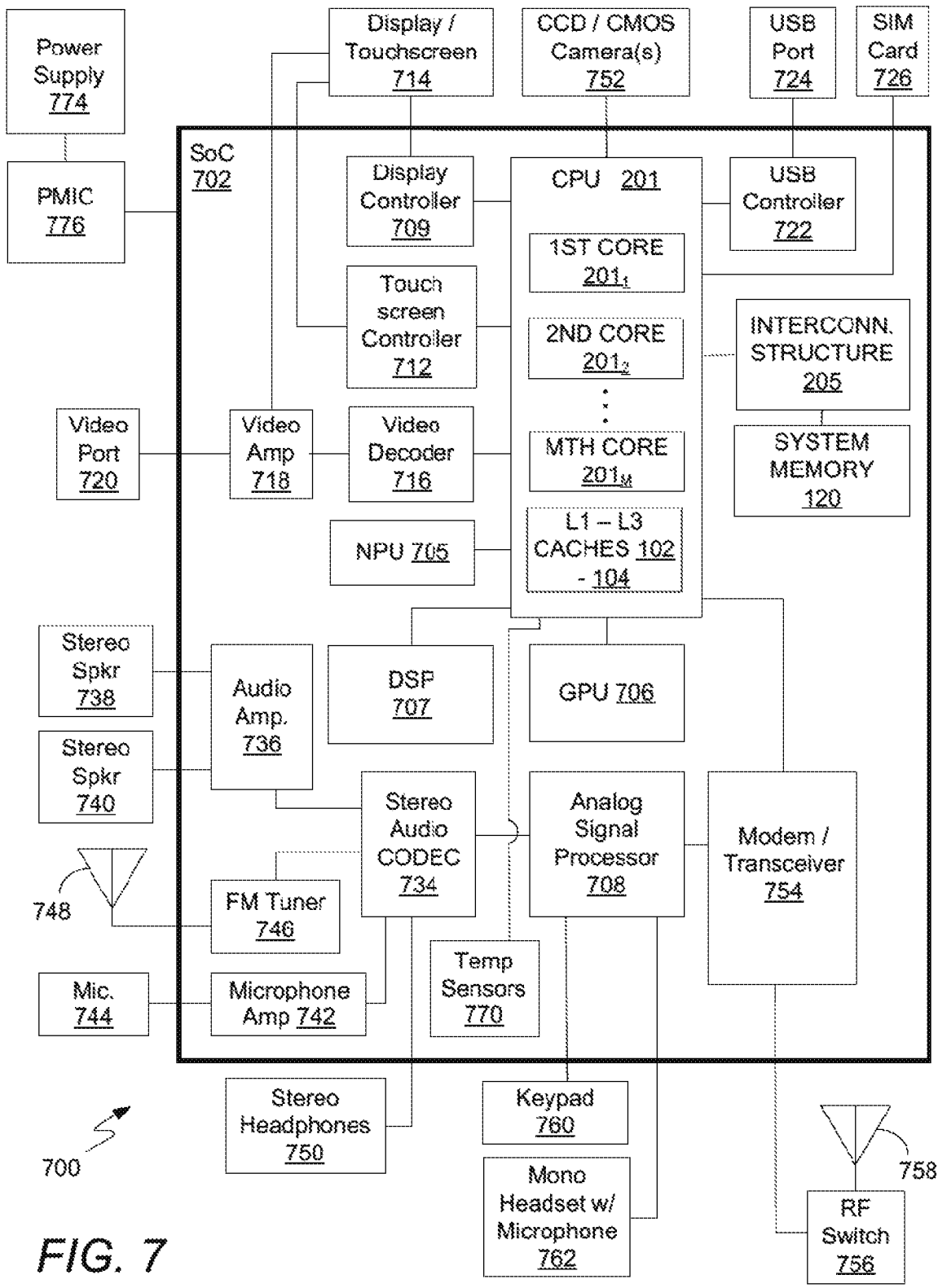
FIG. 7 illustrates an example of a PCD in which exemplary embodiments of systems, methods, computer-readable media, and other examples of the systems and methods of the present disclosure may be implemented.

FIG. 7 illustrates an example of a PCD 700, such as a mobile phone, a smartphone, a portable game console such as an Extended Reality (XR) device, a Virtual Reality (VR) device, an Augmented Reality (AR) device, or a Mixed Reality (MR) device, an automotive autonomous driving system, etc., in which exemplary embodiments of systems, methods, computer-readable media, and other examples of systems and methods according to the inventive principles and concepts of the present disclosure may be implemented. For purposes of clarity, some interconnects, signals, devices, etc., are not shown in FIG. 7.

The PCD 700 may include an SoC 702. The SoC 702 includes the CPU 210, an NPU 705, a GPU 706, a DSP 707, an analog signal processor 708, a modem/modem subsystem 754, or other processors. The CPU 704 may include one or more CPU cores, such as a first CPU core $201_1$, a second CPU core $201_2$, etc., through an $M^{th}$ CPU core $201_M$. The branch predictor logic 510 and the loop stream decoder logic 520 may be employed in one or more of the CPU cores $201_1$-$201_M$, although they would typically be employed in all of the cores $201_1$-$201_M$. Also, although the CPU 210 is depicted in FIG. 7 as being a multi-core CPU, it can have as few as a single core that employs the branch predictor logic 510 and the loop stream decoder logic 520. The CPU cores $201_1$-$201_M$ also perform other operations of the type that they normally perform in a PCD. Alternatively, or in addition, any of the processors of the SoC 702, such as the NPU 705, GPU 706, DSP 707, etc., may have cores that are configured in the manner described above with reference to FIGS. 2-5 to perform the operations described above with reference to FIGS. 2, 3 and 5.

The CPU 210 is interconnected with the system memory 120 via the interconnect structure 205. As indicated above, the interconnect structure 205 comprises the interconnect device 106, the LLC 107 and the LLC controller 208, which comprises the components shown in FIG. 6, including the LCP 610 having logic configured to perform the operations described above with reference to FIGS. 3, 4 and 6.

A display controller 709 and a touch-screen controller 712 may be coupled to the CPU 210. A touchscreen display 714 external to the SoC 702 may be coupled to the display controller 710 and the touch-screen controller 712. The PCD 700 may further include a video decoder 716 coupled to the CPU 210. A video amplifier 718 may be coupled to the video decoder 716 and the touchscreen display 714. A video port 720 may be coupled to the video amplifier 718. A universal serial bus ("USB") controller 722 may also be coupled to CPU 210, and a USB port 724 may be coupled to the USB controller 722. A subscriber identity module ("SIM") card 726 may also be coupled to the CPU 210.

A stereo audio CODEC 734 may be coupled to the analog signal processor 708. Further, an audio amplifier 736 may be coupled to the stereo audio CODEC 734. First and second stereo speakers 738 and 740, respectively, may be coupled to the audio amplifier 736. In addition, a microphone amplifier 742 may be coupled to the stereo audio CODEC 734, and a microphone 744 may be coupled to the microphone amplifier 742. A frequency modulation ("FM") radio tuner 746 may be coupled to the stereo audio CODEC 734. An FM antenna 748 may be coupled to the FM radio tuner 746. Further, stereo headphones 750 may be coupled to the stereo audio CODEC 734. Examples of other devices that may be coupled to the CPU 210 include one or more digital (e.g., CCD or CMOS) cameras 752.

A modem or RF transceiver 754 may be coupled to the analog signal processor 708 and the CPU 210. An RF switch 756 may be coupled to the RF transceiver 754 and an RF antenna 758. In addition, a keypad 760 and a mono headset with a microphone 762 may be coupled to the analog signal processor 708. The SoC 702 can have one or more internal or on-chip thermal sensors 770. A power supply 774 and a PMIC 776 may supply power to the SoC 702.

Firmware or software may be stored in any of the above-described memories, or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses.

1. A method for performing memory transactions in a way that reduces data movement in a memory hierarchy comprising:
   determining whether or not a type of memory transaction being queued in one or more cores of the processor for execution by the processor is one of a plurality of preselected types for which data path alteration is an option;
   determining whether or not a size of a memory block in a system memory associated with the memory transaction exceeds a first preselected size threshold, $S\_TH_1$, value;
   selecting an altered path of data movement for performing the memory transaction if determinations are made that the memory transaction type is one of the preselected types and that the memory block size exceeds the $S\_TH_1$ value, and wherein the selected altered path reduces an amount of data movement relative to unaltered paths of data movement that are used for performing memory transactions that are not of the preselected types; and
   causing the memory transaction to be performed using the altered path of data movement.

2. The method of clause 1, wherein the determining steps are performed in the processor and the selecting step is performed in a last level cache (LLC) controller of the memory hierarchy, the method further comprising:
   prior to performing the selecting step:
   with the processor, forwarding the memory transaction type, the size of the memory block and one or more system memory addresses associated with the memory transaction to the LLC controller;
   in the LLC controller, receiving the transaction type, the size of the memory block and said one or more system memory addresses via an interconnect device of the memory hierarchy;
   and
   during performance of the step of causing the memory transaction to be performed using the altered path of data movement:
   in the LLC controller, using the memory transaction type, the size of the memory block and one or more system memory addresses associated with the memory transaction to cause the memory transaction to be performed.

3. The method of clause 2, further comprising:
   if the processor determines that the memory transaction type is not one of the preselected types or that the memory block size does not exceeds the $S\_TH_1$ value, causing the memory transaction to be performed using an unaltered path of data movement.

4. The method of any of clauses 2 and 3, wherein the step of selecting an altered path of data movement comprises:
   in the LLC controller, determining whether the size of the memory block exceeds a second preselected size threshold, $S\_TH_2$, value; and
   if the LLC controller determines that the size of the memory block does not exceed the $S\_TH_2$ value, the altered path of data movement selected by the LLC controller is a path that includes an LLC memory being written by the LLC controller with the entire memory block associated with the memory transaction, the LLC memory being a part of the memory hierarchy.

5. The method of clause 4, wherein the step of selecting an altered path of data movement further comprises:
   in the LLC controller, if the LLC controller determines that the size of the memory block does not exceed the $S\_TH_2$ value, the altered path of data movement selected by the LLC controller is a path that includes an LLC memory being written by the LLC controller with bytes of a portion of the memory block having a size that does not exceed the size of the LLC memory and bytes of any remaining portion of the memory block that are not written to the LLC memory are written to system memory.

6. The method of any of clauses 2-5, wherein the interconnect device interconnects the processor with the LLC controller and with a memory controller of the system memory, and wherein the LLC controller is configured to cause bytes of the memory block to be written to at least one of system memory and LLC memory by sending transactions to a front end (FE) of the LLC controller that mimic transactions received in the FE from the interconnect device, and wherein the mimicked transactions are based at least in part on the memory block size sent from the processor to the LLC controller via the interconnect device.

7. The method of any of clauses 1-6, wherein said plurality of preselected types of memory transactions include memory setting (memset) and memory copying (memcopy) operations, wherein the memset operation assigns a same preselected value to the entire memory block associated with the memory transaction and wherein the memcopy operation copies the entire memory block from one set of addresses in system memory to another set of addresses in system memory.

8. The method of any of clauses 1-7, wherein the processor is a component of a system-on-a-chip (SoC) integrated circuit package of a personal computing device (PCD).

9. The method of clause 8, wherein the processor is a central processing unit (CPU) of the SoC integrated circuit package.

10. A system for reducing data movement when performing memory transactions in a memory hierarchy, the system comprising:
a processor comprising logic configured to determine whether or not a type of memory transaction being queued in one or more cores of the processor for execution by the processor is one of a plurality of preselected types of memory transactions and to determine whether or not a size of a memory block in a system memory associated with the memory transaction exceeds a first preselected size threshold, $S\_TH_1$, value, the processor comprising logic configured to output the memory transaction type, the memory block size and one or more system memory addresses associated with the memory transaction if determinations are made that the memory transaction type is one of the preselected types and that the memory block size exceeds the $S\_TH_1$ value; and
an LLC controller of the memory hierarchy electrically coupled to the processor by an interconnect device of the memory hierarchy, the LLC controller receiving the memory transaction type, the memory block size and said one or more system memory addresses associated with the memory transaction outputted by the processor via the interconnect device, the LLC controller comprising LLC memory and a last level coprocessor (LCP), the LCP comprising logic configured to select an altered path of data movement for performing the transaction relative to unaltered paths of data movement that are used for performing memory transactions that are not of the preselected types and to cause the memory transaction to be performed using the altered path of data movement.

11. The system of clause 10, wherein the processor further comprises logic configured to cause the memory transaction to be performed using an unaltered path of data movement if the processor determines that the memory transaction type is not one of the preselected types or that the memory block size does not exceeds the $S\_TH_1$ value.

12. The system of any of clauses 10-11, wherein the logic of the LLC controller that is configured to select an altered path of data movement selects the altered path of data movement by determining whether the size of the memory block exceeds a second preselected size threshold, $S\_TH_2$, value, and if not, selects the altered path of data movement to include an LLC memory being written by the LLC controller with the entire memory block associated with the memory transaction, the LLC memory being a part of the memory hierarchy.

13. The system of any of clauses 10-12, wherein the logic of the LLC controller that is configured to select an altered path of data movement selects the altered path of data movement to include the LLC memory being written by the LLC controller with bytes of only a portion of the memory block having a size that does not exceed the size of the LLC memory if the memory block size exceeds the $S\_TH_2$ value.

14. The system of any of clauses 10-13, wherein the LPC is configured to cause bytes of the memory block to be written to at least one of the system memory and the LLC memory by sending transactions to a front end (FE) of the LLC controller that mimic transactions received in the FE from the interconnect device, and wherein the mimicked transactions are based at least in part on the memory block size sent from the processor to the LLC controller via the interconnect device.

15. The system of any of clauses 10-14, wherein said plurality of preselected types of memory transactions include memory setting (memset) and memory copying (memcopy) operations, wherein the memset operation assigns a same preselected value to the entire memory block associated with the memory transaction and wherein the memcopy operation copies the entire memory block from one set of addresses in system memory to another set of addresses in system memory.

16. The system of any of clauses 10-15, wherein the system comprises a system-on-a-chip (SoC) integrated circuit package that comprises the processor.

17. The system of clause 16, wherein the processor is a central processing unit (CPU) of the SoC integrated circuit package.

18. The system of any of clauses 16-17, wherein the SoC integrated circuit package is a component of a personal computing device (PCD).

19. A non-transitory computer-readable medium comprising computer instructions for execution by a processor and by a last level cache (LLC) controller of a memory hierarchy to reduce data movement when performing memory transactions, the computer instructions comprising:
a first set of computer instructions for determining whether or not a type of memory transaction being queued in one or more cores of the processor for execution by the processor is one of a plurality of preselected types for which data path alteration is an option;
a second set of computer instructions for determining whether or not a size of a memory block in a system memory associated with the memory transaction exceeds a first preselected size threshold, $S\_TH_1$, value, the system memory being a part of the memory hierarchy;
a third set of computer instructions for forwarding the memory transaction type, the size of the memory block and one or more system memory addresses associated with the memory transaction to a last level cache (LLC) controller of the memory hierarchy if the processor, in executing the first and second sets of computer instructions, determines that the memory transaction type is one of the preselected types and that the memory block size exceeds the $S\_TH_1$ value;
a fourth set of computer instructions for receiving the transaction type, the size of the memory block and said one or more system memory addresses in the LLC controller via an interconnect device of the memory hierarchy and for selecting an altered path of data movement relative to unaltered paths of data movement that are used for performing memory transactions that are not of the preselected types; and a fifth set of computer instructions for causing the memory transaction to be performed using the altered path of data movement.

20. The computer-readable medium of clause 19, wherein the fourth set of instructions comprises:

computer instructions for determining whether the size of the memory block exceeds a second preselected size threshold, $S\_TH_2$, value;

computer instructions for selecting the altered path of data movement to include an LLC memory being written by the LLC controller with the entire memory block associated with the memory transaction if a determination is made that the size of the memory block does not exceed the $S\_TH_2$ value; and computer instructions for selecting the altered path of data movement to include the LLC memory being written by the LLC controller with bytes of a portion of the memory block having a size that does not exceed the size of the LLC memory if the LLC controller determines that the size of the memory block exceeds the $S\_TH_2$ value.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for performing memory transactions in a way that reduces data movement in a memory hierarchy comprising:

determining with a processor whether or not a type of memory transaction being queued in one or more cores of the processor for execution by the processor is one of a plurality of preselected types for which data path alteration is an option;

determining with the processor whether or not a size of a memory block in a system memory associated with the memory transaction exceeds a first preselected size threshold, $S\_TH_1$, value;

selecting with a last level cache (LLC) controller an altered path of data movement for performing the memory transaction if determinations are made that the memory transaction type is one of the preselected types and that the memory block size exceeds the $S\_TH_1$ value, and wherein the selected altered path reduces an amount of data movement relative to unaltered paths of data movement that are used for performing memory transactions that are not of the preselected types; and causing the memory transaction to be performed using the altered path of data movement when the memory transaction is one of the plurality of preselected types.

2. The method of claim 1, further comprising:

prior to performing the selecting step, with the processor, forwarding the memory transaction type, the size of the memory block and one or more system memory addresses associated with the memory transaction to the LLC controller;

in the LLC controller, receiving the transaction type, the size of the memory block and said one or more system memory addresses via an interconnect device of the memory hierarchy; and during performance of the step of causing the memory transaction to be performed using the altered path of data movement:

in the LLC controller, using the memory transaction type, the size of the memory block and one or more system memory addresses associated with the memory transaction to cause the memory transaction to be performed.

3. The method of claim 2, further comprising:

if the processor determines that the memory transaction type is not one of the preselected types or that the memory block size does not exceed the $S\_TH_1$ value, causing the memory transaction to be performed using an unaltered path of data movement.

4. The method of claim 2, wherein the step of selecting the altered path of data movement comprises:

in the LLC controller, determining whether the size of the memory block exceeds a second preselected size threshold, $S\_TH_2$, value; and when the LLC controller determines that the size of the memory block does not exceed the $S\_TH_2$ value, the altered path of data movement selected by the LLC controller is a path that includes an LLC memory being written by the LLC controller with the entire memory block associated with the memory transaction, the LLC memory being a part of the memory hierarchy.

5. The method of claim 4, wherein the step of selecting the altered path of data movement further comprises:

in the LLC controller, when the LLC controller determines that the size of the memory block does not exceed the $S\_TH_2$ value, the altered path of data movement selected by the LLC controller is a path that includes an LLC memory being written by the LLC controller with bytes of a portion of the memory block having a size that does not exceed the size of the LLC memory and bytes of any remaining portion of the memory block that are not written to the LLC memory are written to system memory.

6. The method of claim 5, wherein the interconnect device interconnects the processor with the LLC controller and with a memory controller of the system memory, and wherein the LLC controller is configured to cause bytes of the memory block to be written to at least one of system memory and LLC memory by sending transactions to a front end (FE) of the LLC controller that mimic transactions received in the FE from the interconnect device, and wherein the mimicked transactions are based at least in part on the memory block size sent from the processor to the LLC controller via the interconnect device.

7. The method of claim 1, wherein said plurality of preselected types of memory transactions include memory setting (memset) and memory copying (memcopy) operations, wherein the memset operation assigns a same preselected value to the entire memory block associated with the memory transaction and wherein the memcopy operation copies the entire memory block from one set of addresses in system memory to another set of addresses in system memory.

8. The method of claim 1, wherein the processor is a component of a system-on-a-chip (SoC) integrated circuit package of a personal computing device (PCD).

9. The method of claim 8, wherein the processor is a central processing unit (CPU) of the SoC integrated circuit package.

10. A system for reducing data movement when performing memory transactions in a memory hierarchy, the system comprising:

a processor comprising logic configured to determine whether or not a type of memory transaction being queued in one or more cores of the processor for execution by the processor is one of a plurality of preselected types of memory transactions and to determine whether or not a size of a memory block in a system memory associated with the memory transaction exceeds a first preselected size threshold, $S\_TH_1$, value, the processor comprising logic configured to output the memory transaction type, the memory block size and one or more system memory addresses associated with the memory transaction if determinations are made that the memory transaction type is one of the preselected types and that the memory block size exceeds the $S\_TH_1$ value; and a last level cache (LLC) controller of the memory hierarchy electrically coupled to the processor by an interconnect device of the memory hierarchy, the LLC controller receiving the memory transaction type, the memory block size and said one or more system memory addresses associated with the memory transaction outputted by the processor via the interconnect device, the LLC controller comprising LLC memory and a last level coprocessor (LCP), the LCP comprising logic configured to select an altered path of data movement for performing the transaction relative to unaltered paths of data movement; the LCP comprising logic configured to select the unaltered paths that are used for performing memory transactions that are not of the preselected types; and the LCP causing the memory transaction to be performed using the altered path of data movement for memory transactions that are of the preselected types.

11. The system of claim 10, wherein the processor further comprises logic configured to cause the memory transaction to be performed using an unaltered path of data movement if the processor determines that the memory transaction type is not one of the preselected types or that the memory block size does not exceed the $S\_TH_1$ value.

12. The system of claim 10, wherein the logic of the LLC controller that is configured to select the altered path of data movement selects the altered path of data movement by determining whether the size of the memory block exceeds a second preselected size threshold, $S\_TH_2$, value.

13. The system of claim 12, wherein when the memory block size exceeds the $S\_TH_2$ value, the logic of the LLC controller that is configured to select the altered path of data movement selects the altered path of data movement to include the LLC memory being written by the LLC controller with bytes of only a portion of the memory block having a size that does not exceed the size of the LLC memory.

14. The system of claim 13, wherein the LPC is configured to cause bytes of the memory block to be written to at least one of the system memory and the LLC memory by sending transactions to a front end (FE) of the LLC controller that mimic transactions received in the FE from the interconnect device, and wherein the mimicked transactions are based at least in part on the memory block size sent from the processor to the LLC controller via the interconnect device.

15. The system of claim 10, wherein said plurality of preselected types of memory transactions include memory setting (memset) and memory copying (memcopy) operations, wherein the memset operation assigns a same preselected value to the entire memory block associated with the memory transaction and wherein the memcopy operation copies the entire memory block from one set of addresses in system memory to another set of addresses in system memory.

16. The system of claim 10, wherein the system comprises a system-on-a-chip (SoC) integrated circuit package that comprises the processor.

17. The system of claim 16, wherein the processor is a central processing unit (CPU) of the SoC integrated circuit package.

18. The system of claim 17, wherein the SoC integrated circuit package is a component of a personal computing device (PCD).

19. A non-transitory computer-readable medium comprising computer instructions for execution by a processor and by a last level cache (LLC) controller of a memory hierarchy to reduce data movement when performing memory transactions, the computer instructions comprising:

a first set of computer instructions for determining whether or not a type of memory transaction being queued in one or more cores of the processor for execution by the processor is one of a plurality of preselected types for which data path alteration is an option;

a second set of computer instructions for determining whether or not a size of a memory block in a system memory associated with the memory transaction exceeds a first preselected size threshold, $S\_TH_1$, value, the system memory being a part of the memory hierarchy;

a third set of computer instructions for forwarding the memory transaction type, the size of the memory block and one or more system memory addresses associated with the memory transaction to a last level cache (LLC) controller of the memory hierarchy when the processor, in executing the first and second sets of computer instructions, determines that the memory transaction type is one of the preselected types and that the memory block size exceeds the $S\_TH_1$ value;

a fourth set of computer instructions for receiving the transaction type, the size of the memory block and said one or more system memory addresses in the LLC controller via an interconnect device of the memory hierarchy and for selecting an altered path of data movement relative to unaltered paths of data movement that are used for performing memory transactions that are not of the preselected types; and a fifth set of computer instructions for causing the memory transaction to be performed using the altered path of data movement.

20. The computer-readable medium of claim 19, wherein the fourth set of instructions comprises:

computer instructions for determining whether the size of the memory block exceeds a second preselected size threshold, $S\_TH_2$, value;

computer instructions for selecting the altered path of data movement to include an LLC memory being written by the LLC controller with the entire memory block associated with the memory transaction when a determination is made that the size of the memory block does not exceed the $S\_TH_2$ value; and computer instructions for selecting the altered path of data movement to include the LLC memory being written by the LLC controller with bytes of a portion of the memory block having a size that does not exceed the size of the LLC memory when the LLC controller determines that the size of the memory block exceeds the $S\_TH_2$ value.

* * * * *